United States Patent
Breedvelt-Schouten et al.

(10) Patent No.: US 9,778,757 B2
(45) Date of Patent: Oct. 3, 2017

(54) TOROIDAL FLEXIBLE INPUT DEVICE

(71) Applicant: INTERNATIONAL BUSINESS MACHINES CORPORATION, Armonk, NY (US)

(72) Inventors: Ilse M. Breedvelt-Schouten, Ottawa (CA); Jana H. Jenkins, Raleigh, NC (US); Jeffrey A. Kusnitz, Campbell, CA (US); James L. Lentz, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 14/276,382

(22) Filed: May 13, 2014

(65) Prior Publication Data
US 2015/0332036 A1 Nov. 19, 2015

(51) Int. Cl.
G06F 3/0346 (2013.01)
G06F 21/36 (2013.01)
G06F 21/35 (2013.01)

(52) U.S. Cl.
CPC ............ *G06F 3/0346* (2013.01); *G06F 21/35* (2013.01); *G06F 21/36* (2013.01)

(58) Field of Classification Search
CPC ............................... G06F 21/36; G06F 3/0346
USPC .......................................................... 726/19
See application file for complete search history.

(56) References Cited

U.S. PATENT DOCUMENTS

| 4,270,216 A | 5/1981 | Suzuki |
| 5,369,911 A | 12/1994 | Fortunado |
| 5,828,370 A | 10/1998 | Moeller |
| 7,030,860 B1* | 4/2006 | Hsu .......... G06F 3/044 178/18.06 |
| 8,199,107 B2* | 6/2012 | Xu .......... G06F 3/0346 345/158 |
| 8,274,534 B2* | 9/2012 | Montague ........... G06F 3/04845 345/418 |
| 8,390,481 B2* | 3/2013 | Pance ..................... G06F 3/044 341/33 |
| 2001/0020276 A1 | 9/2001 | Kim |
| 2003/0006975 A1* | 1/2003 | Moriya ................. G06F 1/1632 345/179 |
| 2003/0156740 A1* | 8/2003 | Siegel .................... G06F 21/10 382/115 |

(Continued)

FOREIGN PATENT DOCUMENTS

WO 2009144363 A1 12/2009

OTHER PUBLICATIONS

Anne Roudaut, Henning Pohl "Touch Input on Curved Surfaces" May 7-12, 2011.*

(Continued)

*Primary Examiner* — Samson Lemma
(74) *Attorney, Agent, or Firm* — Law Office of Jim Boice

(57) ABSTRACT

A method and/or computer program product receives computer inputs from a toroidal flexible input device. Physical contact between a toroidal flexible input device and a display on a computer is detected. The toroidal flexible input device is authenticated, and a communication session between the toroidal flexible input device and the computer is established. The computer then receives inputs from the toroidal flexible input device while the toroidal flexible input device is in physical contact with the display on the computer.

20 Claims, 5 Drawing Sheets

(56) References Cited

U.S. PATENT DOCUMENTS

| | | | |
|---|---|---|---|
| 2003/0214481 A1 | 11/2003 | Xiong | |
| 2004/0113956 A1 | 6/2004 | Bellwood | |
| 2008/0136754 A1 | 6/2008 | Tsuzaki | |
| 2009/0249061 A1 | 10/2009 | Hamilton, II | |
| 2009/0293631 A1* | 12/2009 | Radivojevic | G01L 1/16 73/774 |
| 2010/0225595 A1 | 9/2010 | Hodges et al. | |
| 2011/0018794 A1 | 1/2011 | Linsky et al. | |
| 2011/0199292 A1 | 8/2011 | Killbride | |
| 2011/0205156 A1 | 8/2011 | Gomez | |
| 2012/0086868 A1 | 4/2012 | Takaya | |
| 2012/0303839 A1 | 11/2012 | Jackson et al. | |
| 2013/0044215 A1 | 2/2013 | Rothkopf et al. | |
| 2013/0314339 A1* | 11/2013 | Ueki | G06F 3/041 345/173 |
| 2014/0028921 A1* | 1/2014 | Moon | H04N 21/4126 348/734 |
| 2014/0139422 A1* | 5/2014 | Mistry | G06F 3/014 345/156 |
| 2014/0139454 A1* | 5/2014 | Mistry | G06F 3/041 345/173 |
| 2014/0282224 A1 | 9/2014 | Pedley | |
| 2014/0337791 A1* | 11/2014 | Agnetta | G06F 3/0481 715/784 |
| 2015/0326575 A1* | 11/2015 | Ramirez Flores | H04L 63/0876 726/5 |

OTHER PUBLICATIONS

T. Bishop, "Here Comes Sphere: Microsoft Debuts Computing in Round", Hearst Seattle Media, LLC, seattlepi.com, Jul. 28, 2008, pp. 1-3.

Cnetasia Staff, "Sony Squeezes a 'Gummi' Computer", Microsoft Corporation, zdnet.com, Jul. 1, 2003, 1 Page.

T. Davies, "Nokia Kinetic Bendy Phone is the Next Big Thing", Microsoft Corporation, conversations.nokia.com, Oct. 28, 2011, pp. 1-3.

D. Zax, "Are Bendable Smart Phones the Future?", MIT Technology Review, Nov. 1, 2011, pp. 1-3.

List of IBM Patents or Patent Applications Treated as Related—Oct. 9, 2014, pp. 1-2.

R. Metz, "A Password You Wear on Your Wrist", MIT Technology Review, technologyreview.com, Feb. 27, 2013, pp. 1-2.

D. Belic, "Passban Unveils Wearable Device Verification for Smartphones", Intomobile, intomobile.com, Mar. 6, 2013, pp. 1-2.

W. Uhlman, "Squeeze Clock", coroflot.com, CORE77, Inc., New York, NY, May 16, 2009; <http://www.coroflot.com/wu/Squeeze-Clock>, pp. 1-2.

D. Holman et al.; "Unifone: Designing for Auxiliary Finger Input in One Handed Mobile Interactions"; TEI '13 Proceedings of the 7th International Conference on Tangible, Embedded and Embodied Interaction; Feb. 10, 2013-Feb. 13, 2013; pp. 177-184; ISBN-13: 9781450318983; Association for Computing Machinery; New York, NY and USA.

* cited by examiner

TOROIDAL FLEXIBLE INPUT DEVICE

BACKGROUND

The present disclosure relates to the field of computers, and specifically to the use of input devices used with computers. Still more specifically, the present invention relates to wireless input devices.

SUMMARY

In one embodiment of the present invention, a method and/or computer program product receives computer inputs from a toroidal flexible input device. Physical contact between a toroidal flexible input device and a display on a computer is detected. The toroidal flexible input device is authenticated, and a communication session between the toroidal flexible input device and the computer is established. The computer then receives inputs from the toroidal flexible input device while the toroidal flexible input device is in physical contact with the display on the computer.

In one embodiment of the present invention, a toroidal flexible input device comprises: a toroidal shell; a touch sensor within the toroidal shell, wherein the touch sensor detects a position and level of pressure exerted by a user's fingers against edges of the toroidal shell; an accelerometer within the toroidal shell, wherein the accelerometer detects lateral and rotational movement of the toroidal shell; a strain gauge within the toroidal shell, wherein the strain gauge detects compression deformation of the toroidal shell; a universal unique identifier (UUID) generator, wherein a UUID identifies a particular input device; a user identifier generator, where a user identifier identifies an authorized user of the toroidal flexible input device; and a wireless transceiver, wherein the wireless transceiver sends and receives data between a computer and the touch sensor, the accelerometer, the strain gauge, the UUID generator, and the user identifier generator.

DETAILED DESCRIPTION

Figure 1:
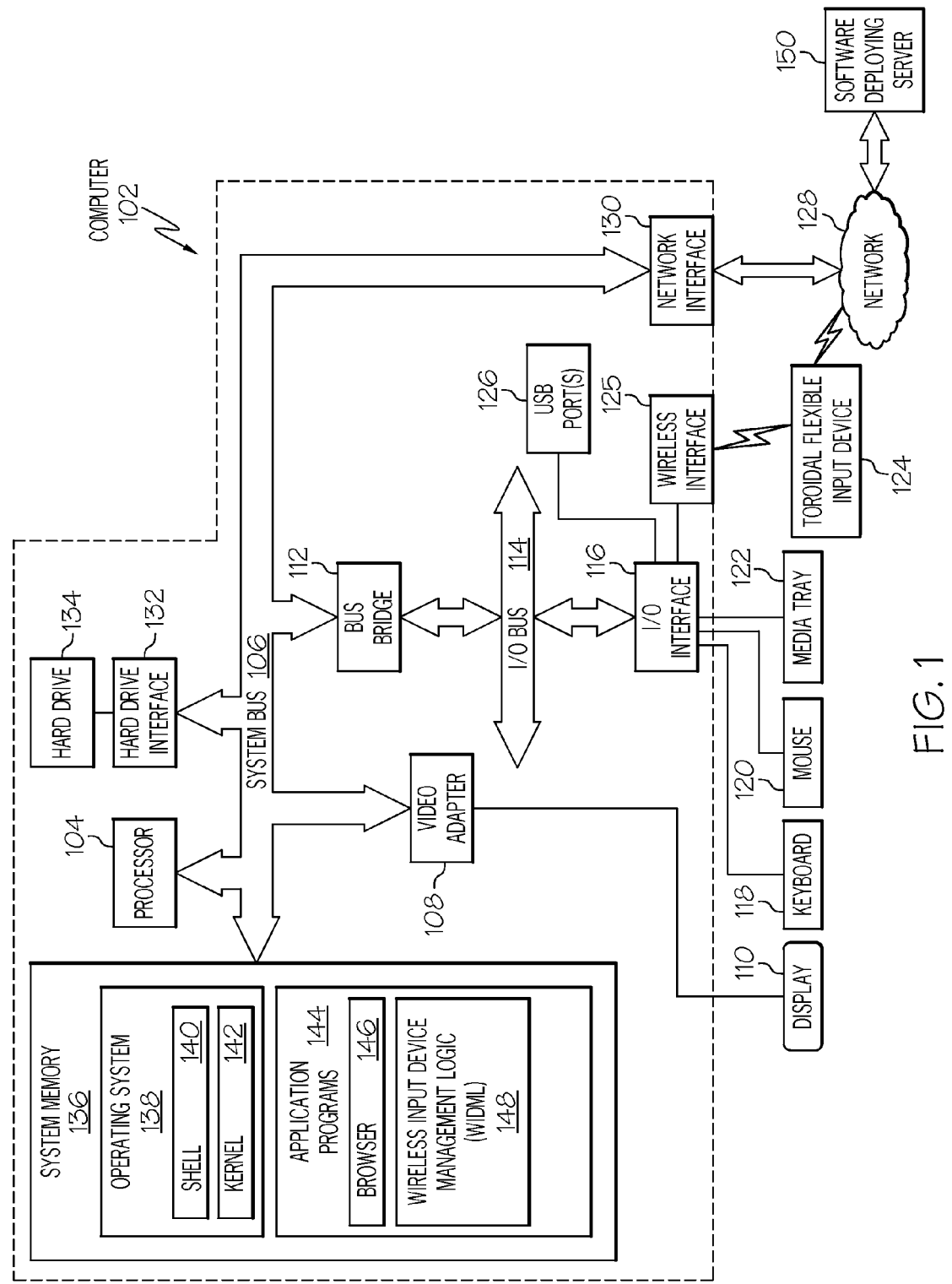
FIG. 1 depicts an exemplary system and network which may be used to implement the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or a toroidal flexible input device 124.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a toroidal flexible input device 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 using a network interface 130. Network interface 130 is a hardware network interface, such as a network interface card (NIC), etc. Network 128 may be an external network such as the Internet, or an internal network such as an Ethernet or a virtual private network (VPN).

Note that in one embodiment, the toroidal flexible input device 124 communicates with computer 102 directly via a wireless interface 125, using radio frequency, infrared, or other wireless transmission carrier signals. In one embodiment, the toroidal flexible input device 124 communicates with computer 102 via the network 128, assuming that network 128 includes hardware capable of transceiving (transmitting and receiving) radio frequency, infrared, or other wireless transmission carrier signals.

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150.

Application programs 144 in computer 102's system memory (as well as software deploying server 150's system memory) also include a wireless input device management logic (WIDML) 148. WIDML 148 includes code for implementing the processes described below, including those described in FIGS. 2-5. In one embodiment, computer 102 is able to download WIDML 148 from software deploying server 150, including in an on-demand basis, wherein the code in WIDML 148 is not downloaded until needed for execution. Note further that, in one embodiment of the present invention, software deploying server 150 performs all of the functions associated with the present invention (including execution of WIDML 148), thus freeing computer 102 from having to use its own internal computing resources to execute WIDML 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
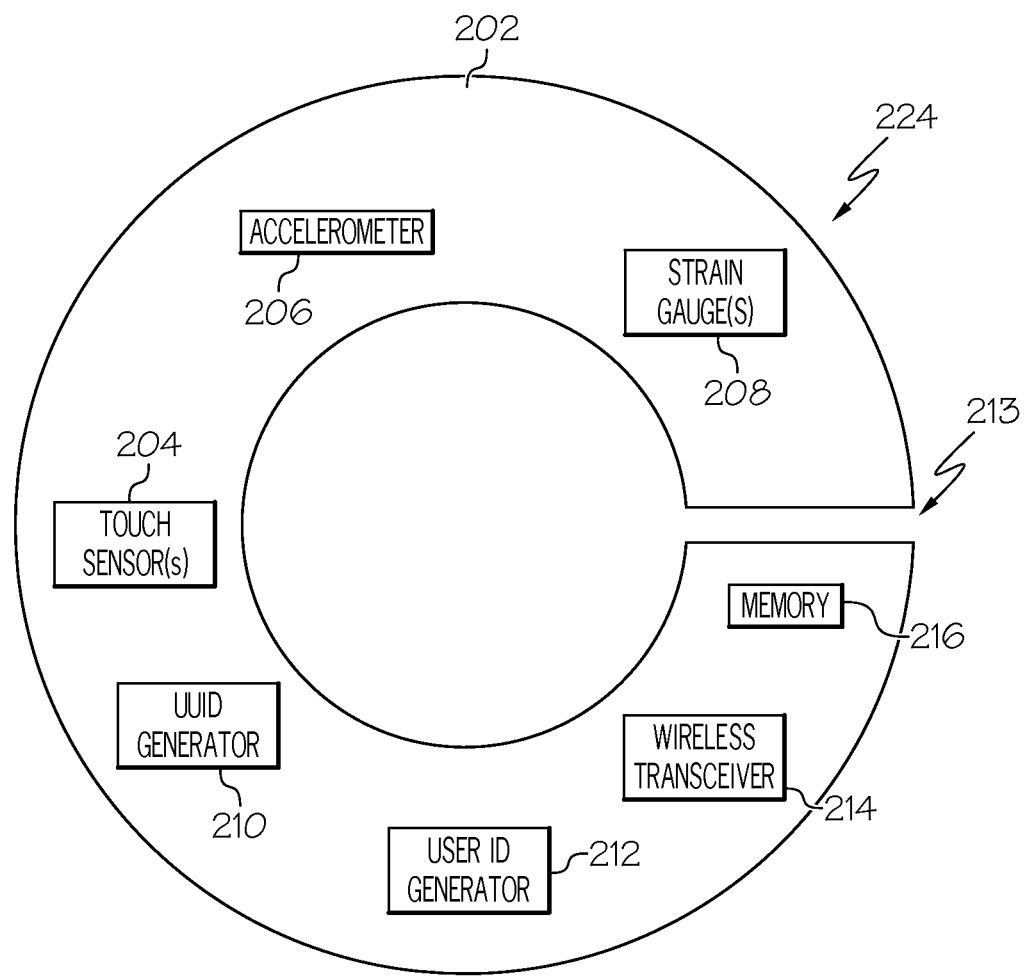
FIG. 2 illustrates an exemplary embodiment of a novel toroidal flexible input device in accordance with one or more embodiments of the present invention.

With reference now to FIG. 2, an exemplary embodiment of a novel toroidal flexible input device in accordance with one or more embodiments of the present invention is presented.

As suggested by the name and in one or more embodiments of the present invention, a toroidal flexible input device 224 1) has the overall shape of a toroid (i.e., a "donut"), and 2) is flexible. The toroidal shape is imparted by an outer toroidal shell 202. This outer toroidal shell 202 is constructed of a pliable material, such as metal, plastic, composite materials (e.g., carbon fiber), etc.

Within the toroidal shell 202 are multiple electronic components, including one or more of the components depicted in FIG. 1 for computer 102. Furthermore and more specifically in one or more embodiments, within the toroidal shell are one or more touch sensor(s) 204, one or more accelerometer(s) 206, one or more strain gauge(s) 208, a universally unique identifier (UUID) generator 210, a user identifier generator 212, and a wireless transceiver 214.

The touch sensor(s) 204 detect a position and level of pressure exerted by a user's fingers against edges of the toroidal shell 202. That is, when the user holds the toroidal flexible input device 224 in his/her hands, his/her fingers press against the edges of the toroidal shell 202. The pressures imparted, indicating both where the fingers are positioned against the toroidal shell 202 and the amount of pressure they are exerting, are detected by the touch sensor(s) 204. These touch sensor(s) 204 may include deflection sensors (e.g., piezoelectric crystals) and/or other devices that are capable of converting mechanical pressure into an electric signal.

Accelerometer 206 detects lateral and rotational movement of the toroidal shell. While mechanical in one embodiment (i.e., using springs, etc.), in other embodiments the accelerometer 206 employs the use of electronic devices (e.g., piezoelectric, piezoresistive and capacitive components) to measure the magnitude and direction of movement of the toroidal flexible input device 224 (in one, two or three physical Cartesian dimensions, as well as the fourth time dimension).

Strain gauge(s) 208 are specifically constructed and positioned through the toroidal flexible input device 224 (i.e., within the toroidal shell 202) to detect compression deformation of the toroidal shell (e.g., a user pinching the toroidal flexible input device 224 to cause it to change shape). As with the accelerometer 206, the strain gauge(s) 208 can utilize either mechanical (e.g., springs, etc.) or electronic devices (e.g., piezoelectric, piezoresistive and capacitive components) to measure the amount of pinching/deflection caused by a user's fingers when pressed against the toroidal shell 202. That is, the toroidal shell 202 is capable of being elastically pressed. More specifically, a user can squeeze the toroidal shell 202, causing it to become more elongated while being squeezed/pinched. The toroidal shell 202 then returns to its original shape when no longer being squeezed/pinched. This elasticity is due to the physical composition of the materials used to construct the toroidal shell 202. In one or more embodiments of the present invention, the slit 214 allows the toroidal flexible input device 224 to be expandable as well, thus allowing it to open up enough to slide over a person's arm, thus making the toroidal flexible input device 224 wearable (like a bracelet). However, a preferred embodiment has no slit 214, in order to ensure uniformity in movement of the toroidal shell 202 when it is pinched (squeezed together) by the user.

The universally unique identifier (UUID) generator 210 generates a UUID that identifies a particular input device, such as toroidal flexible input device 224. In one embodiment and as suggested by its name, the UUID generator 210 generates the UUID by taking real-time readings from the touch sensor(s) 204 and/or strain gauge(s) 208, as well as manufacturer data from a memory 216 (e.g., a register, cache, static memory, etc.) within the toroidal shell 202 as inputs to generate a dynamic UUID. That is, the dynamic UUID changes according to how the toroidal flexible input device 224 is being physically manipulated. In another embodiment, the UUID is just a UUID created by the manufacturer of the toroidal flexible input device 224, and which is stored within the memory 216. Thus, in this other embodiment, the UUID generator 210 merely retrieves the UUID data from memory 216.

The user identifier (ID) generator 212 generates an identity of the user who is 1) authorized to use the toroidal flexible input device 224, and/or 2) is currently handling the toroidal flexible input device 224. In a manner similar to that just described for the UUID generator 210, in one embodiment the user ID generator 212 generates the user ID by taking real-time readings from the touch sensor(s) 204 and/or strain gauge(s) 208, as well as user-input data from memory 216 as inputs to generate a dynamic user ID. This dynamic user ID changes according to how the toroidal flexible input device 224 is being physically manipulated. In another embodiment, the user ID is just a user identity (e.g., name, etc.) that has been input by the user and/or an authorizing entity into the memory 216. In this other embodiment, user ID generator 212 merely retrieves the user ID data from memory 216.

The wireless transceiver 214 is capable of sending and receiving data between a computer (e.g., computer 102 shown in FIG. 1) and the touch sensor(s) 204, the accelerometer 206, the strain gauge(s) 208, the UUID generator 210, and the user ID generator 212. This allows the user to know what type of input device is being used (i.e., what type of device toroidal flexible input device 224 is), and/or who is using and/or authorized to use the toroidal flexible input device 224.

In one or more embodiments of the present invention, the toroidal flexible input device 224 is enabled when being physically placed against a display on a computer. Determining whether or not the toroidal flexible input device 224 is physically against the display can be accomplished by a pressure sensor array embedded within the display, an electromagnetic field sensor array (e.g., an array of sensors that detect if an infrared beam has been blocked by the toroidal flexible input device 224), or a triangulation system that determines, based on heartbeat signals (e.g., generated by a processor such as processor 104 in FIG. 1 but not shown in FIG. 2, along with the wireless transceiver 214 shown in FIG. 2) from the toroidal flexible input device 224, the position of the toroidal flexible input device 224 as being pressed against the display.

Figure 3:
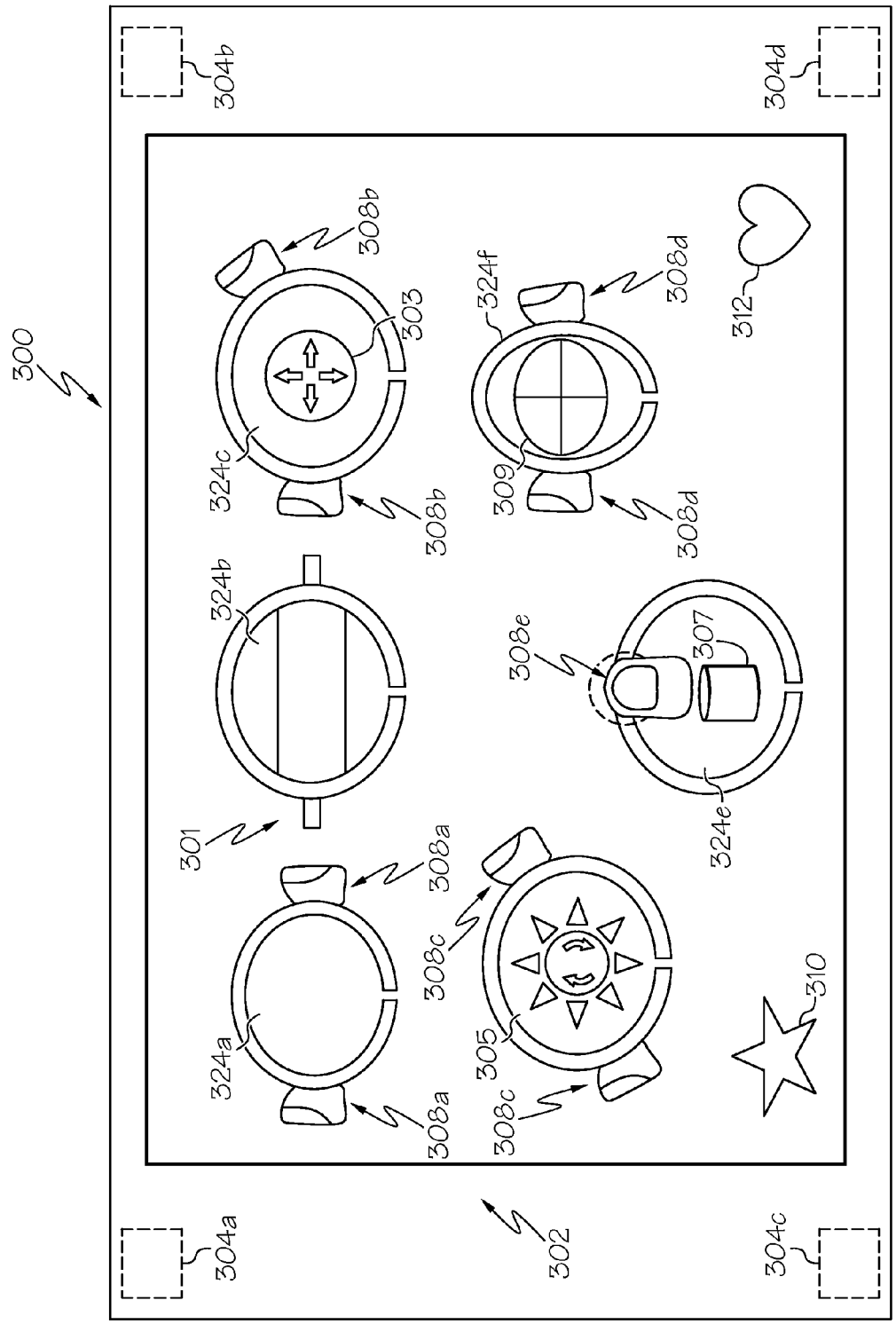
FIG. 3 depicts the novel toroidal flexible input device being physically positioned against a display on a computer.

For example, consider FIG. 3, which depicts the novel toroidal flexible input device being physical positioned against a display 306 on a computer 302 (analogous to computer 102 shown in FIG. 1). Assume for exemplary purposes that computer 302 is embedded in a table (e.g., a table top 300 that is supported by legs 304*a*-304*d*). Thus, the user is able to easily manipulate and move the toroidal flexible input device around the horizontal display 306. Depicted within FIG. 3 are multiple examples of the toroidal flexible input device 224 shown in FIG. 2. These multiple examples are depicted as toroidal flexible input devices 324*a*-324*e*. Note that while multiple toroidal flexible input devices 324*a*-324*e* are depicted on display 306, it is to be understood that the depicted variations (toroidal flexible input devices 324*a*-324*e*) are actually variations of the same toroidal flexible input device 224 shown in FIG. 2. Thus, multiple toroidal flexible input devices 324*a*-324*e* are solely depicted together on display 306 to conserve the number of figures presented herein. However, in one embodiment, multiple toroidal flexible input devices 224 could be used simultaneously, if so desired.

Continuing with FIG. 3, the toroidal flexible input device 224 from FIG. 2 (depicted as toroidal flexible input devices 324*a*-324*e* in FIG. 3) is capable of various uses and/or implementation and/or embodiments, as now described.

An exemplary embodiment of the toroidal flexible input device is depicted as toroidal flexible input device 324*a*. As depicted, a user's fingers 308*a* hold the toroidal flexible input device 324*a* against the display 306 and/or position it thereon.

In one embodiment, the toroidal flexible input device 324*b* is capable of acting as a magnifier. That is, toroidal flexible input device 324*b*, when positioned over an image (e.g., a line 301) being shown on the display 306 communicates with the display to show a magnified image. That is, any image that is within the interior of the toroidal flexible input device 324*b* (as positioned over the image) will be magnified.

In one embodiment, the toroidal flexible input device 324*c* is capable of moving an icon 303. That is, when the user's fingers 308*b* position the toroidal flexible input device 324*c* over the icon 303, then the icon will be moved to wherever the user's fingers 308*b* move the toroidal flexible input device 324*c*.

In one embodiment, the toroidal flexible input device 324*d* is able to rotate an icon 324*d*. That is, when the toroidal flexible input device 324*d* rotates in one direction or another, the icon 305 that is within the interior field created by the toroidal flexible input device 324*d* will rotate in a similar manner.

In one embodiment, the toroidal flexible input device 324*e* is able to act as a clicker. That is, when the toroidal flexible input device 324*e* is placed over an icon 307, then simply tapping the toroidal flexible input device 324*e* with his finger 308*e* causes the icon 307 to be clicked, thus causing a predetermined action (e.g., opening a database) to occur.

In one embodiment, the toroidal flexible input device 324*f* is capable of being pinched together, thus capturing an icon 309. That is, the toroidal flexible input device 324*f* is initially placed over (surrounding) the icon 309, similar to that shown for toroidal flexible input device 324*c* and icon 303. However, in order to capture the icon 309, the user's fingers 308*d* physically squeeze the toroidal flexible input device 324*f* together, thus trapping/capturing the icon 309, which can only now be moved to other places on the display 306.

Note that all of the movements, tappings, rotations, squeezing, etc. just described are detected by one or more of the hardware components illustrated in FIG. 2. Note further that all actions (activating icons, magnifications, rotations, etc.) of the images on the display are performed by one or more processors within the computer that supports the display, based on the computer's determination of the position of the toroidal flexible input device and the movement determined by the toroidal flexible input device itself.

In order for the system to know where the toroidal flexible input device 324 is positioned on the display 306 relative to a particular displayed image (e.g., elements 301, 305, 307), a coordinate correlation is made between the toroidal flexible input device 324 and the displayed image. For example, assume that the toroidal flexible input device 324 is positioned two inches from a top of the display 306 and three inches from the left side of the display 306. This position may be identified by touch sensors embedded in the display (e.g., a "touch screen"), infrared or other grid transceivers surrounding the display, etc. The position of the displayed image is ascertained by the system according to graphical control signals being sent to the display via a video adapter (e.g., video adapter 108). These graphical control signals describe 1) the shape of the image, and 2) the position on the display 306 where the image is to be located.

Once the toroidal flexible input device 324 is positioned over a particular displayed image, then the rotation, pinching, movement, etc. of the toroidal flexible input device 324, as described herein, will change the bounded image size, shape, position, etc. in a synchronous manner with the toroidal flexible input device 324. That is, as the toroidal flexible input device 324 is rotated, moved, etc., the image that it is placed over on the display 306 will rotate, move, etc. in a same manner/direction/etc.

In order to authenticate a particular toroidal flexible input device 324, and thus enable the computer 302 to accept the user inputs from that particular toroidal flexible input device 324, an authorization process takes place in one or more embodiments of the present invention. In one embodiment, this authorization process is simply performed by comparing the UUID and/or user ID (see FIG. 2) from the toroidal flexible input device 324 to a trusted list of authorized users/input devices. However, in another embodiment, the authorization is accomplished by the user performing a particular act with the toroidal flexible input device 324.

For example, consider icon 310 and icon 312 in FIG. 3. Assume that during a setup operation (e.g., in which the user selects various authentication process options), the user has chosen a "star" image (e.g., icon 310) to be the authorization icon. Therefore, in order to authenticate the toroidal flexible input device 324 and/or its user, the user will position a toroidal flexible input device 324 (e.g., toroidal flexible input device 324*a*) around icon 310. By clicking, rotating, wiggling, or otherwise activating the toroidal flexible input device 324*a*, the icon 310 is activated, thus allowing the toroidal flexible input device 324*a* to provide additional input to the computer 302. However, there is also icon 312 (the "heart" shaped icon) displayed on the display 306. This icon 312 is a "disabling icon". If the user positions the toroidal flexible input device 324*a* around the icon 312 and activates the toroidal flexible input device 324*a*, then the user will be locked out of the system (computer 302). In one embodiment, this lockout remains in effect until a system administrator unlocks the system.

Note that in one embodiment, icon 310, icon 312, and/or other disabling icons are stochastically (randomly) displayed on the display 306 before inputs from the toroidal flexible input device 224 are allowed. Thus, the user must know which icon (310) to choose in order to unlock the system, and then place the toroidal flexible input device 224 over that icon.

While the present invention has been described thus far as requiring the user to physically place the toroidal flexible input device against the display of the computer while manipulating the toroidal flexible input device, in one embodiment the toroidal flexible input device only needs to initially be placed against the display for initialization and/or authorization. Thereafter, an image of a virtual toroidal flexible input device is generated on the display. This virtual toroidal flexible input device then follows the movement of the real (physical) toroidal flexible input device.

Figure 4:
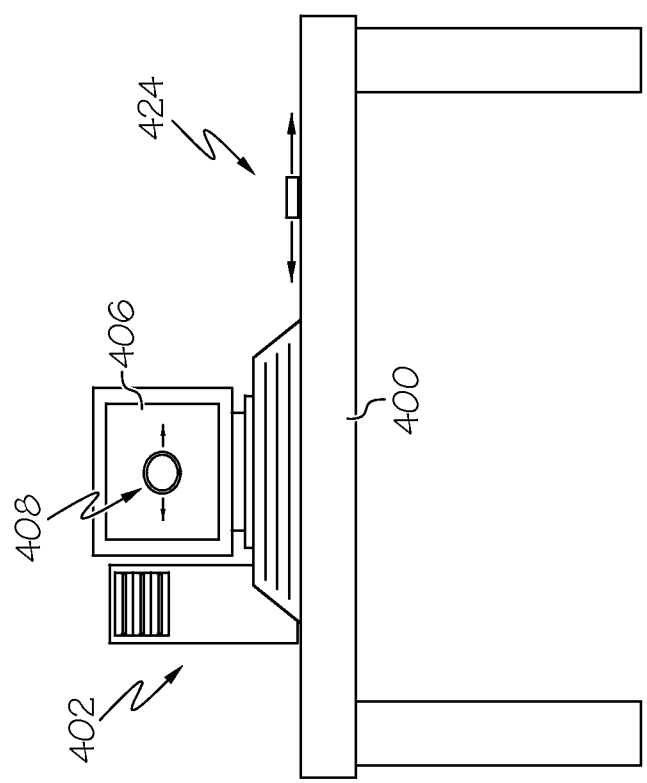
FIG. 4 illustrates an icon that is representative of the physical toroidal flexible input device, depicted in FIG. 2, being presented on a computer display.

For example, consider FIG. 4, which illustrates a toroidal icon 408 that is representative of the physical toroidal flexible input device 424 (analogous to the toroidal flexible input device 224 depicted in FIG. 2). As shown, the toroidal icon 408 is presented on a computer display 406 of a traditional computer 402, which may be a desktop computer, a laptop, etc., which is placed on top of a table 400. In this embodiment, the toroidal flexible input device 424 is initially placed against the display 406. However, after the toroidal flexible input device 424 is recognized and authenticated by the computer 402 (by being placed against the display 406), and the toroidal flexible input device 424 is removed from the display 408, the toroidal icon 408 is generated and displayed on the display 406. Thereafter, the toroidal icon 408 mimics (on the display 406) the physical movements of the toroidal flexible input device 424 as it moves across the top of the table 400.

Figure 5:
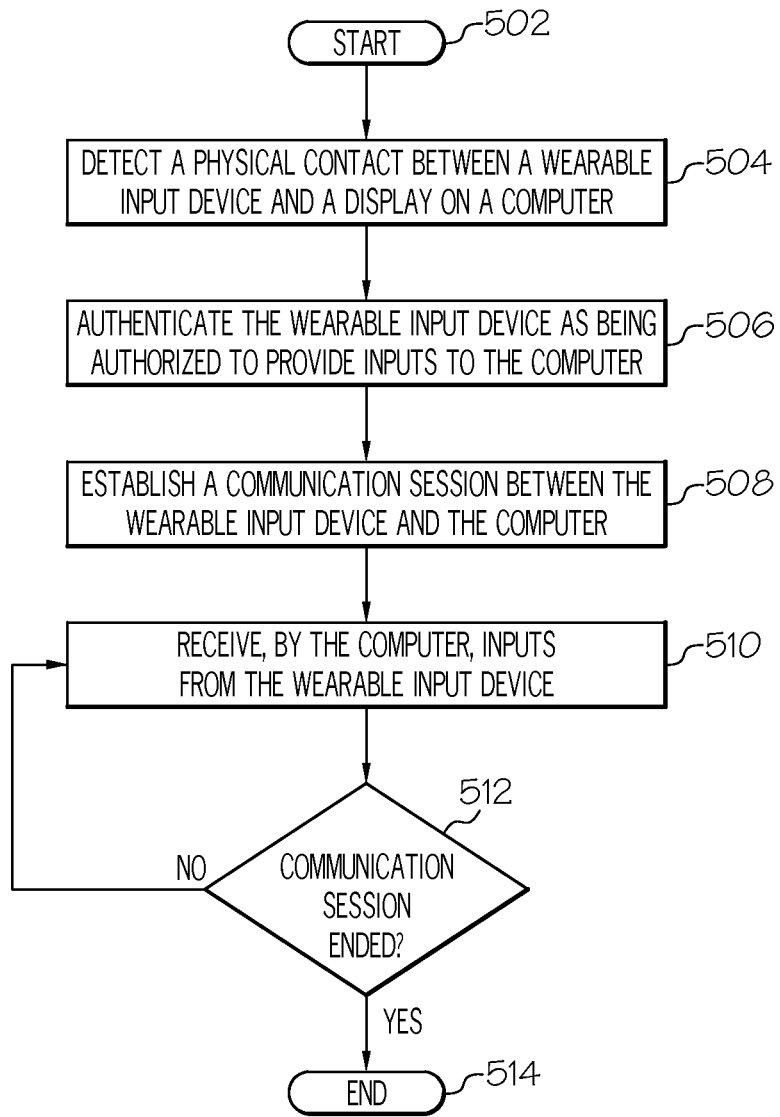
FIG. 5 is a high level flow chart of one or more exemplary steps taken by one or more processors to receive inputs from a toroidal flexible input device.

With reference now to FIG. 5, a high level flow chart of one or more exemplary steps taken by one or more processors to receive inputs from a toroidal flexible input device is presented.

After initiator block 502, a physical contact between a toroidal flexible input device and a display on a computer is detected (block 504). This physical contact is detected by one or more of the sensors in a grid array on the display (e.g., a touch screen, an IR grid, etc.).

As described in block 506, the toroidal flexible input device is then authenticated (recognized) as being authorized to provide inputs to the computer. This authorization can be effected using any process described above with FIG. 2.

Once the toroidal flexible input device is authenticated, a communication session between the toroidal flexible input device and the computer is established (block 508). In one embodiment, this communication session allows the toroidal flexible input device to provide inputs to the computer as long as it is positioned against the display screen (block 510). In one embodiment, as long as the toroidal flexible input device is placed against the display screen, it can continue to provide inputs to the computer.

Once the communication session ends (query block 512), the process ends (terminator block 514).

In one embodiment of the present invention, the toroidal flexible input device is authenticated by simply matching a user identifier within the toroidal flexible input device with an authorized user name, where the user identifier identifies a user of the toroidal flexible input device. (See FIG. 2).

In one embodiment of the present invention, the toroidal flexible input device is authenticated by matching a universally unique identifier (UUID) within the toroidal flexible input device with an authorized input device name, where the UUID identifies a particular input device. (See FIG. 2.)

In one embodiment of the present invention, the toroidal flexible input device is authenticated by detecting a placement of the toroidal flexible input device over an authentication icon on the display. (See element 310 in FIG. 3.)

In one embodiment of the present invention, the toroidal flexible input device is authenticated by detecting a placement of a user's fingers on predetermined positions on the toroidal flexible input device while the toroidal flexible input device is held against the display. For example, consider toroidal flexible input device 324*a* in FIG. 3. Note that the user's fingers 308*a* are positioned at 9 o'clock and 3 o'clock (left side and right side) on the toroidal flexible input device 324*a*. In this embodiment, the user's fingers 308*a* must be in these positions. Otherwise, the system will not authenticate the toroidal flexible input device 324*a*, and will accept no inputs from it. In one embodiment, the position of the user's fingers 308*a* are detected by heat sensors (not shown) embedded within the display 306. Note that the user's fingers 308*a* are not clicking, rotating, etc. the toroidal flexible input device 324*a* in FIG. 3 in order to authenticate the toroidal flexible input device 324*a*. Rather, it is merely the positioning of the user's fingers 308*a* that cause the toroidal flexible input device 324*a* to be authenticated and/or activated.

In one embodiment of the present invention, the toroidal flexible input device is detected as being positioned over an image on the display (e.g., by sensors on the display). A rotational movement of the toroidal flexible input device is detected (e.g., by one or more of the hardware sensors, including but not limited to elements 204, 206, 208 shown in FIG. 2). In response to detecting the rotational movement of the toroidal flexible input device, one or more processors (e.g., element 104 in FIG. 1) then rotate the image on the display in a corresponding manner.

In one embodiment of the present invention, a detection is made (e.g., by sensors on the display) of the toroidal flexible input device being positioned over an image on the display. Hardware sensors within the toroidal flexible input device then detect a pinching movement of the toroidal flexible input device. This pinching movement is caused by a user pressing against edges of the toroidal flexible input device. Sensors within the toroidal flexible input device then detect a movement of the toroidal flexible input device across the display, while continuing to detect the pinching against the image. That is, the image on the screen is deemed to be pinched if the image is within an interior of the toroidal flexible input device while the toroidal flexible input device is placed against the display. Thereafter, in response to detecting the movement of the toroidal flexible input device while pinching the image, the image is moved on the display to a new position. That is, pinching the physical toroidal flexible input device while it is positioned over the image results in the image being "trapped" by the pinched physical toroidal flexible input device, such that the physical toroidal flexible input device can now drag the image around on the screen.

In one embodiment of the present invention, the toroidal flexible input device is detected as being positioned over an image on the display. A tapping against the toroidal flexible input device by a user is detected (see element 324*e* in FIG.

3). In response to detecting the tapping against the toroidal flexible input device, processors within the computer (that includes the display) activate a function represented by the image on the display.

In one embodiment of the present invention, the toroidal flexible input device is detected as being positioned over an image on the display. In response to sensors within the display detecting the toroidal flexible input device being positioned over the image on the display, an appearance of the image on the display is enlarged. (See elements 301 and 324*b* in FIG. 3.)

In one embodiment of the present invention, a break in the physical contact between the toroidal flexible input device and the display on a computer is detected. That is, in this embodiment, the physical toroidal flexible input device is lifted off the display. In response to detecting the break in the physical contact between the toroidal flexible input device and the display on a computer, a toroidal icon representing the toroidal flexible input device is generated. (See FIG. 4.) Thereafter, when a movement of the toroidal flexible input device is detected while not in contact with the display (e.g., moving on a tabletop), the toroidal icon on the display is moved according to the movement of the toroidal flexible input device while not in contact with the display. In this embodiment, the toroidal icon mimics the physical toroidal flexible input device, were it to still be placed against the display.

For example, if the toroidal icon is positioned over an image on the display, then the toroidal icon rotates that image whenever the physical toroidal flexible input device rotates.

Similarly, in one embodiment if the toroidal icon is positioned over an image on the display and the physical toroidal flexible input device is pinched, then the toroidal icon is linked to the image on the display, allowing the image to be moved about on the display.

Similarly, in one embodiment if the toroidal icon is positioned over an image on the display and the physical toroidal flexible input device is physically tapped by a user, then a function represented by the image on the display over which the toroidal icon is positioned is activated.

Similarly, in one embodiment if the toroidal icon is being positioned around an image on the display, then the image will be enlarged/magnified on the display.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Having thus described embodiments of the invention of the present application in detail and by reference to illustrative embodiments thereof, it will be apparent that modifications and variations are possible without departing from the scope of the invention defined in the appended claims.

What is claimed is:

1. A method of receiving computer inputs from a toroidal flexible input device, the method comprising:
  detecting, by one or more hardware sensors, a physical contact between a toroidal flexible input device and a display on a computer;
  authenticating, by one or more hardware processors, the toroidal flexible input device as being authorized to provide inputs to the computer;
  establishing, by one or more hardware processors, a communication session between the toroidal flexible input device and the computer;
  receiving, by the computer and via the display on the computer, inputs from the toroidal flexible input device, wherein the inputs result from a user altering a shape of the toroidal flexible input device while in physical contact with the display;
  detecting, by one or more hardware sensors, the toroidal flexible input device being positioned over an image on the display;
  detecting, by one or more hardware sensors within the toroidal flexible input device, a rotational movement of the toroidal flexible input device; and
  in response to detecting the rotational movement of the toroidal flexible input device, rotating, by one or more hardware processors, the image on the display.

2. The method of claim 1, further comprising:
  authenticating, by one or more hardware processors, the toroidal flexible input device by matching a user identifier within the toroidal flexible input device with an authorized user name, wherein the user identifier identifies a user of the toroidal flexible input device.

3. The method of claim 1, further comprising:
  authenticating, by one or more hardware processors, the toroidal flexible input device by matching a universally unique identifier (UUID) within the toroidal flexible input device with an authorized input device name, wherein the UUID identifies a particular input device.

4. The method of claim 1, further comprising:
authenticating, by one or more hardware processors, the toroidal flexible input device by detecting a placement of the toroidal flexible input device over an authentication icon on the display.

5. The method of claim 1, further comprising:
authenticating, by one or more hardware processors, the toroidal flexible input device by detecting a placement of a user's fingers on predetermined positions on the toroidal flexible input device while the toroidal flexible input device is held against the display.

6. The method of claim 1, further comprising:
detecting, by one or more hardware sensors, the toroidal flexible input device being positioned over an image on the display;
detecting, by one or more hardware sensors within the toroidal flexible input device, a pinching movement of the toroidal flexible input device, wherein the pinching movement is caused by a user pressing against edges of the toroidal flexible input device;
detecting, by one or more hardware sensors, a movement of the toroidal flexible input device while pinching the image, wherein the image is pinched if the image is within an interior of the toroidal flexible input device while the toroidal flexible input device is placed against the display; and
in response to detecting the movement of the toroidal flexible input device while pinching the image, moving, by one or more hardware processors, the image on the display to a new position.

7. The method of claim 1, further comprising:
detecting, by one or more hardware sensors, the toroidal flexible input device being positioned over an image on the display;
detecting, by one or more hardware sensors within the toroidal flexible input device, a tapping against the toroidal flexible input device by a user; and
in response to detecting the tapping against the toroidal flexible input device, activating, by one or more hardware processors, a function represented by the image on the display.

8. The method of claim 1, further comprising:
detecting, by one or more hardware sensors, the toroidal flexible input device being positioned over an image on the display; and
in response to detecting the toroidal flexible input device being positioned over the image on the display, enlarging, by one or more hardware processors, an appearance of the image on the display.

9. The method of claim 1, further comprising:
detecting, by one or more hardware sensors, a break in the physical contact between the toroidal flexible input device and the display on a computer;
in response to detecting the break in the physical contact between the toroidal flexible input device and the display on a computer, generating, by one or more hardware processors, a toroidal icon representing the toroidal flexible input device;
detecting, by one or more hardware sensors within the toroidal flexible input device, a movement of the toroidal flexible input device while not in contact with the display; and
moving, by one or more hardware processors, the toroidal icon on the display according to the movement of the toroidal flexible input device while not in contact with the display.

10. The method of claim 9, further comprising:
detecting, by one or more hardware sensors, the toroidal icon being positioned over an image on the display;
detecting, by one or more hardware sensors within the toroidal flexible input device, a rotational movement of the toroidal flexible input device;
generating, by one or more hardware processors, a rotational movement of the toroidal icon that correlates to the rotational movement of the toroidal flexible input device; and
in response to detecting the rotational movement of the toroidal flexible input device, rotating, by one or more hardware processors, the image on the display.

11. The method of claim 9, further comprising:
detecting, by one or more hardware sensors, the toroidal icon being positioned over an image on the display;
detecting, by one or more hardware sensors within the toroidal flexible input device, a pinching movement of the toroidal flexible input device, wherein the pinching movement is caused by a user pressing against edges of the toroidal flexible input device;
in response to detecting the pinching movement of the toroidal flexible input device, linking, by one or more hardware processors, the toroidal icon to the image on the display;
detecting, by one or more hardware processors, a movement of the toroidal icon while linked to the image on the display; and
in response to detecting the movement of the toroidal flexible input device while linked to the image on the display, moving, by one or more hardware processors, the image to a new position on the display.

12. The method of claim 9, further comprising:
detecting, by one or more sensors, the toroidal icon being positioned over an image on the display;
detecting, by one or more hardware sensors within the toroidal flexible input device, a tapping against the toroidal flexible input device by a user; and
in response to detecting the tapping against the toroidal flexible input device, activating, by one or more hardware processors within the computer, a function represented by the image on the display over which the toroidal icon is positioned.

13. The method of claim 9, further comprising:
detecting, by one or more sensors, the toroidal icon being positioned around an image on the display; and
in response to detecting the icon being positioned around the image on the display, enlarging, by one or more hardware processors, an appearance of the image on the display.

14. A computer program product for receiving computer inputs from a toroidal flexible input device, the computer program product comprising a non-transitory computer readable storage medium having program code embodied therewith, the program code readable and executable by a processor to perform a method comprising:
detecting a physical contact between a toroidal flexible input device and a display on a computer;
authenticating the toroidal flexible input device as being authorized to provide inputs to the computer;
establishing a communication session between the toroidal flexible input device and the computer;

receiving, by the computer, inputs from the toroidal flexible input device, wherein the inputs result from a user altering a position of the toroidal flexible input device upon the display;

detecting, by one or more hardware sensors, the toroidal flexible input device being positioned over an image on the display;

detecting, by one or more hardware sensors within the toroidal flexible input device, a rotational movement of the toroidal flexible input device; and in response to detecting the rotational movement of the toroidal flexible input device, rotating, by one or more processors, the image on the display.

15. The computer program product of claim 14, wherein the method performed by the processor executing the program code further comprises:

authenticating the toroidal flexible input device by matching a universally unique identifier (UUID) within the toroidal flexible input device with an authorized input device name, wherein the UUID identifies a particular input device.

16. The computer program product of claim 14, wherein the method performed by the processor executing the program code further comprises:

authenticating the toroidal flexible input device by detecting a placement of the toroidal flexible input device over an authentication icon on the display.

17. The computer program product of claim 14, wherein the method performed by the processor executing the program code further comprises:

authenticating the toroidal flexible input device by detecting a placement of a user's fingers on predetermined positions on the toroidal flexible input device while the toroidal flexible input device is held against the display.

18. The method of claim 1, wherein the display is a flat touch screen.

19. The method of claim 1, further comprising:

disabling, by one or more hardware processors, the toroidal flexible input device by detecting a placement of the toroidal flexible input device over a disabling icon on the display.

20. A toroidal flexible input device comprising:

a hardware processor, a computer readable memory, and a non-transitory computer readable storage medium;

first program instructions to detect, by one or more hardware sensors on the toroidal flexible input device, a physical contact between a toroidal flexible input device and a display on a computer;

second program instructions to authenticate the toroidal flexible input device as being authorized to provide inputs to the computer;

third program instructions to establish a communication session between the toroidal flexible input device and the computer;

fourth program instructions to receive, via the display on the computer, inputs from the toroidal flexible input device, wherein the inputs result from a user altering a shape of the toroidal flexible input device while in physical contact with the display;

fifth program instructions to detect, via one or more hardware sensors within the toroidal flexible input device, the toroidal flexible input device being positioned over an image on the display;

sixth program instructions to detect, via one or more hardware sensors within the toroidal flexible input device, a rotational movement of the toroidal flexible input device; and seventh program instructions to cause, in response to detecting the rotational movement of the toroidal flexible input device, a rotation of the image on the display; and wherein the first, second, third, fourth, fifth, sixth, and seventh program instructions are stored on the non-transitory computer readable storage medium for execution by the hardware processor via the computer readable memory.

* * * * *